US008449384B2

(12) United States Patent
Baerlocher et al.

(10) Patent No.: US 8,449,384 B2
(45) Date of Patent: May 28, 2013

(54) SYSTEMS AND METHODS FOR PLAYER REWARDS

(75) Inventors: Anthony J. Baerlocher, Reno, NV (US); Daniel J. De Waal, Las Vegas, NV (US)

(73) Assignee: IGT, Reno, NV (US)

( * ) Notice: Subject to any disclaimer, the term of this patent is extended or adjusted under 35 U.S.C. 154(b) by 475 days.

(21) Appl. No.: 12/408,436

(22) Filed: Mar. 20, 2009

(65) Prior Publication Data

US 2010/0240443 A1 Sep. 23, 2010

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |
| ***G06Q 30/00*** | (2012.01) |

(52) U.S. Cl.
USPC ..... 463/25; 705/14.12; 705/14.27; 705/14.28

(58) Field of Classification Search
USPC .................... 463/25; 705/14.12, 14.27, 14.28
See application file for complete search history.

(56) References Cited

U.S. PATENT DOCUMENTS

| | | | | |
|---|---|---|---|---|
| 6,394,907 | B1 | 5/2002 | Rowe | |
| 6,675,152 | B1 | 1/2004 | Espin et al. | |
| 6,682,421 | B1 | 1/2004 | Rowe et al. | |
| 6,852,031 | B1 | 2/2005 | Rowe | |
| 7,351,146 | B2 | 4/2008 | Kaminkow | |
| 7,362,862 | B2 * | 4/2008 | Schneier et al. | 380/251 |
| 2003/0032474 | A1 | 2/2003 | Kaminkow | |
| 2003/0168805 | A1 * | 9/2003 | Samberg | 273/248 |
| 2003/0186745 | A1 * | 10/2003 | Nguyen et al. | 463/42 |
| 2004/0254010 | A1 * | 12/2004 | Fine | 463/25 |
| 2006/0143085 | A1 | 6/2006 | Adams et al. | |
| 2007/0077988 | A1 * | 4/2007 | Friedman | 463/25 |
| 2007/0117613 | A1 * | 5/2007 | Hoover et al. | 463/25 |
| 2007/0117623 | A1 | 5/2007 | Nelson et al. | |
| 2007/0243934 | A1 | 10/2007 | Little et al. | |
| 2007/0271113 | A1 | 11/2007 | Nelson et al. | |
| 2008/0004996 | A1 | 1/2008 | Kuehling | |
| 2008/0254893 | A1 * | 10/2008 | Patel et al. | 463/42 |

FOREIGN PATENT DOCUMENTS

| | | |
|---|---|---|
| EP | 2409281 | 1/2012 |
| WO | WO 2004/013820 A2 | 2/2004 |
| WO | 2010/107450 | 9/2010 |

OTHER PUBLICATIONS

International Search Report and Written Opinion dated Dec. 21, 2009 from PCT/US2009/057199.
European Patent Office Communication mailed Nov. 7, 2011, issued in EP Application No. 09792625.7.
International Preliminary Report on Patentability dated Sep. 29, 2011, issued in application No. PCT/US2009/057199.

* cited by examiner

*Primary Examiner* — Fernando L Toledo
*Assistant Examiner* — Karen Kusumakar
(74) *Attorney, Agent, or Firm* — Neal, Gerber & Eisenberg LLP

(57) ABSTRACT

Players in a player loyalty scheme are awarded points based on their point-generating activity and are then ranked in order of generated points. Rank-based points are then associated with each rank according to a predefined mapping scheme. The rank-based point totals may be updated periodically. Rank-based points may also be used in tournament play.

17 Claims, 8 Drawing Sheets

| Player | Coin In | Coin Out | Denom | Total Bet ($) | Player Status | Event-generated points |
|---|---|---|---|---|---|---|
| A | 100 | 2,000 | 0.01 | 1.00 | 3 | 0.100 |
| B | 1,235 | 26,000 | 0.05 | 1.00 | 2 | 0.048 |
| C | 200 | 50 | 0.25 | 0.75 | 2 | 3.995 |
| D | 3,698 | 600 | 0.01 | 1.20 | 2 | 6.355 |
| E | 60 | 0 | 0.05 | 0.10 | 2 | 62.100 |
| F | 56,982 | 500 | 0.25 | 5.00 | 1 | 113.786 |
| G | 100 | 50 | 0.01 | 1.00 | 1 | 3.941 |
| H | 500 | 100 | 0.01 | 0.50 | 3 | 5.450 |
| I | 20 | 2 | 1 | 1.00 | 1 | 7.333 |
| J | 2,000 | 360 | 0.01 | 1.80 | 3 | 6.044 |

FIG. 8A

| Player | Coin In | Coin Out | Denom | Total Bet ($) | Player Status | Event-generated points |
|---|---|---|---|---|---|---|
| A | 150 | 2,000 | 0.01 | 1.50 | 3 | 0.151 |
| B | 1,240 | 26,010 | 0.05 | 1.00 | 2 | 0.048 |
| C | 201 | 1,050 | 0.25 | 0.75 | 2 | 0.195 |
| D | 3,718 | 665 | 0.01 | 1.20 | 2 | 5.765 |
| E | 90 | 20 | 0.05 | 0.10 | 2 | 4.386 |
| F | 57,034 | 15,000 | 0.25 | 5.00 | 1 | 3.804 |
| G | 110 | 82 | 0.01 | 1.00 | 1 | 2.542 |
| H | 510 | 100 | 0.01 | 0.50 | 3 | 5.550 |
| I | 520 | 202 | 1 | 1.00 | 1 | 2.571 |
| J | 2,050 | 460 | 0.01 | 1.80 | 3 | 4.841 |

FIG. 8B

| Event-generated points | RANK | Rank-based points |
|---|---|---|
| 113.7864 | F | 35 |
| 62.1 | E | 42 |
| 7.333333 | I | 36 |
| 6.354742 | D | 34 |
| 6.043767 | J | 32 |
| 5.450495 | H | 30 |
| 3.995098 | C | 28 |
| 3.941176 | G | 26 |
| 0.10045 | A | 24 |
| 0.048306 | B | 10 |

FIG. 8C

| Event-generated points | RANK | Rank-based points |
|---|---|---|
| 5.76456456 | D | 60 |
| 5.54950495 | H | 57 |
| 4.84121475 | J | 54 |
| 4.38571429 | E | 51 |
| 3.80367975 | F | 48 |
| 2.57142857 | I | 45 |
| 2.54216867 | G | 42 |
| 0.19481446 | C | 39 |
| 0.15067466 | A | 36 |
| 0.04847949 | B | 33 |

FIG. 8D

| | | FINAL RANK | |
|---|---|---|---|
| 34 | 60 | 94 | D |
| 42 | 51 | 93 | E |
| 30 | 57 | 87 | H |
| 32 | 54 | 86 | J |
| 35 | 48 | 83 | F |
| 36 | 45 | 81 | I |
| 26 | 42 | 68 | G |
| 28 | 39 | 67 | C |
| 24 | 36 | 60 | A |
| 10 | 33 | 43 | B |

FIG. 8E

SYSTEMS AND METHODS FOR PLAYER REWARDS

BACKGROUND

This invention relates to gaming machines, such as video slot machines and video poker machines, or for tracked table games. More particularly, the present invention relates to methods and systems for allowing game players to participate in loyalty programs on gaming machines and during other gaming activities.

As technology in the gaming industry progresses, the traditional mechanically driven reel slot machines are being replaced or supplemented with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

One related method of gaining and maintaining a game player's interest in game play is loyalty point programs, such as player tracking programs, offered at various casinos. Loyalty point programs provide rewards to players that typically correspond to the player's level of patronage (e.g., to the player's playing frequency and/or total amount of game plays at a given casino). Loyalty point rewards may be free meals, free lodging and/or free entertainment. These rewards may help to sustain a game player's interest in additional game play during a visit to a gaming establishment and may entice a player to visit a gaming establishment to partake in various gaming activities.

In general, loyalty programs may be applied to any game of chance offered at a gaming establishment. An example of a hardware and/or software implementation of a loyalty reward program with respect to a number of gaming machines is described as follows. FIG. 1 is a block diagram of a number of gaming machines with player tracking units connected to servers providing player tracking services. In casino 150, gaming machines 100, 101, 102 and 103 are connected, via the data collection unit (DCU) to the player tracking/accounting server 120. The DCU 106, which may be connected to up to 32 player tracking units in a particular example, consolidates the information gathered from player tracking units in communication with the DCU 106 and forwards the information to a player tracking account server such as 120.

In another casino 151, a different player tracking server 121 is connected to gaming machines 130 and 131. In yet another casino 152, a separate player tracking server 122 is connected to gaming machines 132 and 133.

In gaming machine 100 of casino 150, a player tracking unit 107 and slot machine interface board (SMIB) 103 are mounted within a main cabinet 8 of the gaming machine. A top box 6 is mounted on top of the main cabinet 8 of the gaming machine. In many types of gaming machines, the player tracking unit is mounted within the top box 6. Usually, player tracking units, such as 107, and SMIBs, such as 103, are manufactured as separate units before installation into a gaming machine. The player tracking unit 107 includes three player tracking devices, a card reader 24, a key pad 22, and a display 16, all mounted within the unit.

The player tracking unit 107 communicates with the player tracking server via the SMIB 103, a main communication board 110 and the data collection unit 106. The player tracking unit 107 is usually connected to the master gaming controller 104 via a serial connection of some type and communicates with the master gaming controller 104 using a communication protocol of some type. For example, the master gaming controller 104 may employ a subset of the Slot Accounting System (SAS protocol) developed by International Game Technology of Reno, Nev. to communicate with the player tracking unit 107.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 107 may detect this event and receive certain identification information contained on the card. For example, a player's name, address, and player tracking account number encoded on the magnetic striped card, may be received by the player tracking unit 107. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

After a player has inserted her or his player tracking card into the card reader 24, the player tracking unit 107 may command the display 16 to display the game player's name on the display 16 and also, may optionally display a message requesting the game player to validate their identity by entering an identification code using the key pad 22. Once the game player's identity has been validated, the player tracking information is relayed to the player tracking server 120. Typically, the player tracking server 120 stores player tracking account records including the number of player tracking points previously accumulated by the player.

During game play on the gaming machine, the player tracking unit 120 may poll the master gaming controller 104 for game play information such as how much money the player has wagered on each game, the time when each game was initiated and the location of the gaming machine. The game play information is sent by the player tracking unit 107 to the player tracking server 120. While a player tracking card is inserted in the card reader 24, the player tracking server 120 may use the game play information provided by the player tracking unit 107 to generate player tracking points and add the points to a player tracking account identified by the player tracking card. The player tracking points generated by the player tracking server 120 are stored in a memory of some type on the player tracking server.

In many gaming establishments, loyalty programs that allow a player to earn "complimentaries" or "comps", such as free rooms/buffets/shows etc., during table game play are very common. A player may earn "comps" for playing table games, such as black jack, baccarat, pai gow poker, keno and roulette. Depending on the gaming establishment, a loyalty program based upon table game play may or may not be combined with a loyalty program based upon slot game play.

Comps at table games are awarded using a rating system. To get rated, a player must typically give their name to a casino service representative every time they sit down to play a table game. The player must supply their name even if they have only moved from one table to an adjacent table. During the player's game play at the table, a casino service representative, such as a pit boss, keeps track of, or rates, the player. This means that the casino service person writes down how much a player buys in for, what his average bet is, how fast they play, how long they play and how much they win or lose. When the player leaves the table their rating is handed in. The game play information from their table gaming session is entered into a computer usually connected to a remote server that stores a record of the player's game playing history. If the player then asks for dinner for two at the coffee shop the pit boss can look up their game play history and, based on guidelines, which may vary from casino to casino, decide whether or not a comp is justified. When a comp is justified, the pit boss can offer the player a voucher valid for the requested comp.

Player tracking/comp cards and player tracking/comp programs are becoming more and more popular. They have become a de facto method of doing business at casinos. However, many tracking/comp cards and other systems for providing rewards to players require storage of a large amount of data regarding players. In general, all point-generating activity is recorded so that it can later be verified. Points are generally accumulated in a linear manner, with points added to a previous point total to obtain a new point total. However, such a cumulative point system favors players who have accumulated a large number of points in the past, even if they have not provided much business recently. This may discourage newer players, because it takes a long time to acquire significant points. Therefore, there is a need for systems and methods for rewarding players that is more flexible than prior systems.

SUMMARY

In examples of the present invention, players are awarded points (e.g. loyalty points) in a manner that is not simply proportional to the amount of money they spend. Instead, multiple factors are considered and are condensed into a single number representing all point-generating activity by the player. Players are then ranked according to their generated-points. A mapping is then performed that assigns rank-based points to each player according to rank. This mapping may assign more points to lower ranked players in some cases. Also, the mapping may reduce the deviation of a group of players so that players do not accumulate excessive points, or fall far behind other players. Such ranking may also be used in tournament play to keep players interest in the tournament by preventing players from gaining large leads, or falling far behind. Indicators of players' ranks may be written to individualized instruments associated with each player, such as smart cards.

A method of providing player points to a plurality of players according to an embodiment includes: obtaining an event-generated point value for each of the plurality of players; ranking the plurality of players according to the event-generated point values; and associating rank-generated point values with each of the plurality of players, the rank-generated point value being determined from each player's rank according to a predetermined mapping of ranks to rank-generated point values.

In an embodiment, a method of managing a plurality of wager-based gaming machines that are operated by a plurality of players in a competition includes: receiving data from the plurality of wager-based gaming machines regarding player activity on each of the plurality of wager-based gaming machines; awarding the plurality of players a plurality of first point values, each player awarded a first point value according to the player's activity on their wager-based gaming machine; ranking the plurality of players according to their associated first point values, the ranking assigning each of the plurality of players a new rank; obtaining a plurality of second point values for the plurality of players, the second point value for each player obtained from the player's new rank according to a predetermined mapping of new ranks to second points; calculating a final rank for each of the plurality of players by combining each player's initial rank and their new rank; and providing awards to selected players according to their final rank.

In an embodiment, a method of operating a gaming network that includes a plurality of player-operated wager-based gaming machines connected to a server includes the steps of: assigning each wager-based gaming machine player an initial rank that designates their position relative to other wager-based gaming machine players; subsequently updating the ranks of the plurality of wager-based gaming machine players, the updating including quantifying each player's eligible activity and ranking the plurality of players according to their eligible activity to obtain an activity-rank, and combining the activity-rank with the initial rank to obtain a final rank; and writing the final rank in place of the initial rank in a computer readable storage medium.

A wager-based gaming network according to an embodiment includes: a plurality of wager-based gaming machines; and a server connected to each of the plurality of wager based gaming machines, the server configured to rank players of the plurality of wager-based gaming machines based on player activity and to convert player ranks thus obtained to rank-based points according to a predetermined mapping of ranks to rank-based points, the server further configured to maintain player rankings based on the rank based points.

BRIEF DESCRIPTION OF THE DRAWINGS

FIG. 8A shows an example of event-generated points for a group of players during a first period.

FIG. 8B shows event-generated points for the players of FIG. 8A during a second period.

FIG. 8C shows ranking of players according to event-generated points of FIG. 8A and subsequent mapping of ranks to rank-based points.

FIG. 8D shows ranking of players according to event-generated points of FIG. 8B and subsequent mapping of ranks to rank-based points.

FIG. 8E shows combining ranks from FIGS. 8C and 8D to obtain updated ranks.

DESCRIPTION OF THE ILLUSTRATED EMBODIMENTS

Concepts important to many embodiments of this invention include "loyalty points," "loyalty point sessions," and "loyalty points initiation events." Loyalty points refer to any type of points accrued for participating in designated activities at a gaming establishment. Such establishments include casinos, hotels where gaming activities are provided, stores where gaming activities are permitted, Internet-based gaming activities, and the like. Designated activities include, but are not limited to, gaming activity such as playing gaming machines, card games such as black jack, pai gow poker, baccarat and poker, betting on public event outcomes, table games such as roulette, craps, keno and lotteries, etc. Other patronage activities at gaming establishments may accrue loyalty points. As indicated above, loyalty points represent a form of credit accrued for patronage. The points can be redeemed for a variety of goods or services (or translated to other forms of credit) within a gaming establishment or affiliated establishment. Player tracking points are a typical example of "loyalty points."

Loyalty point sessions are sessions during which a person is performing the designated activity and during which loyalty points accrue. Such session may be delineated by a first event and a second event (such as the "game events" described above). Loyalty point sessions can be triggered or initiated by events that need not involve conventional player tracking initiation events (e.g., insertions of player tracking cards). Thus, the person can begin accruing loyalty points even if he/she forgets to insert his/her player tracking card or otherwise fails to initiate a conventional player tracking session. Further, it is possible that the entire process is performed anonymously so that the gaming establishment never knows who is accruing the loyalty points—or at least not via a conventional player tracking methodology.

Figure 1:
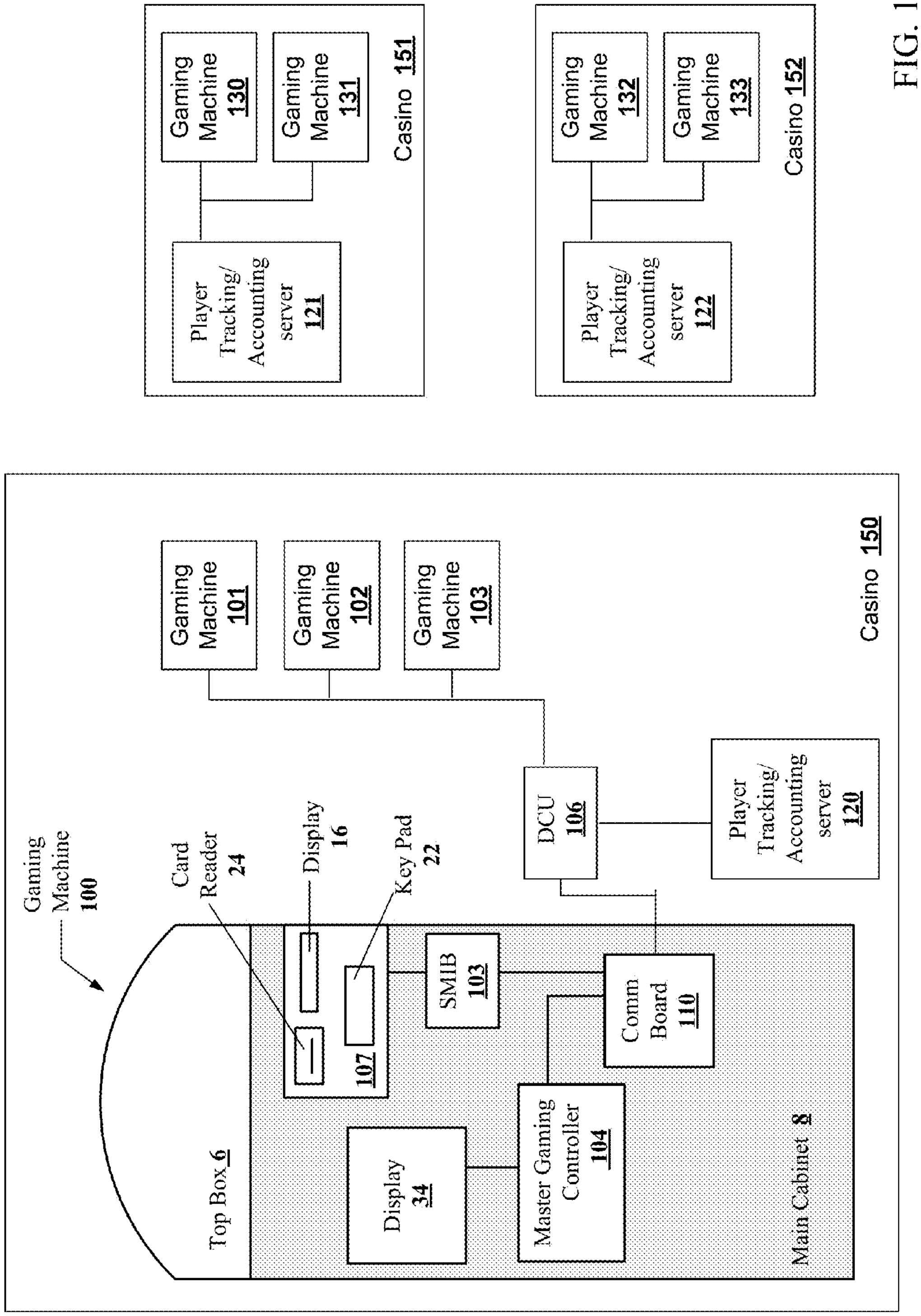
FIG. 1 PRIOR ART
FIG. 1 is a block diagram of a number of gaming machines with player tracking units connected to servers providing player tracking services.
Figure 2:
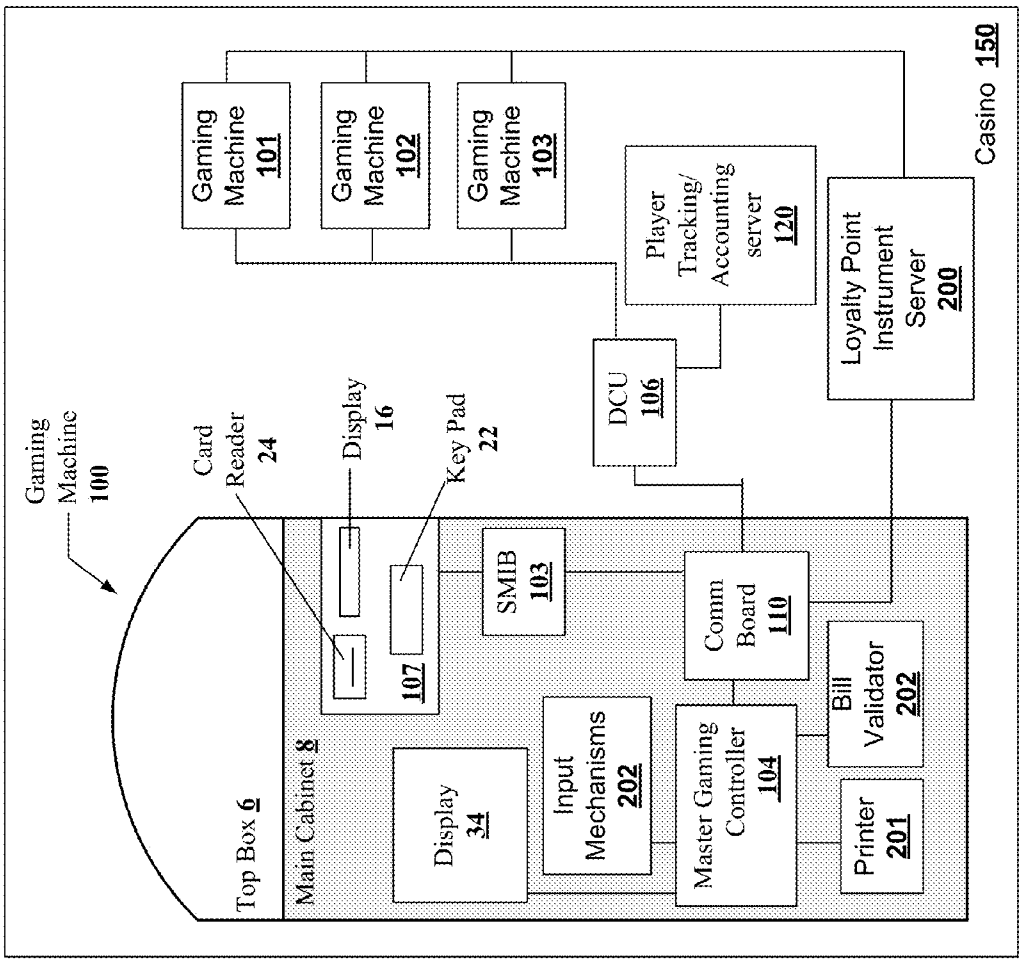
FIG. 2 is a block diagram of a gaming machine connected to a player tracking server and a loyalty program server allowing loyalty program instrument transactions.

FIG. 2 is a block diagram of gaming machines 100, 101, 102 and 103 connected to a player tracking server 120 and a loyalty program instrument server 200 allowing loyalty program instrument transactions. To begin play, the player may insert a bill or a bar-coded printed ticket (e.g. an EZPAY™ ticket) into bill validator 202 to register credits on the gaming machine. When credits are registered on the gaming machine 100, a logic device located on the gaming machine 100, such as master gaming controller 104 or a logic device located in the player tracking unit 107, may begin to generate loyalty points, such as player tracking points. As another example, when credits are registered on the gaming machine 100, a remote logic device such as a logic device on the player tracking accounting server 120 or a logic device on the loyalty program instrument server 200 may begin to accrue loyalty points. Next, the player, using input mechanisms 202, may make wagers on a number of games presented on the gaming machine and view the game outcomes on display 34. Based upon a manner in which the player participates in game play on the gaming machine 100, such as the amount wagered over a specific period of time, loyalty points may be awarded to the player. A rate at which the player accrues loyalty points may be adjusted according to the following parameters (without limitation thereto): 1) the time of the day, 2) the day of the week, 3) month of the year, 4) a total amount wagered, 5) an amount of time spent playing, 6) a game denomination, 7) a promotional event and 8) a game type.

The amount of loyalty points awarded to the game player is calculated by a logic device located on the gaming machine, by a remote gaming device or combinations thereof. When the logic device used to calculate the awarded loyalty points is located remotely, the master gaming controller 104 may transfer certain gaming machine information, such as wager amounts, to the remote logic device. For instance, when the player tracking account server 120 or the loyalty program server 200 calculates the amount of loyalty points awarded during a particular game play session, the master gaming controller 104 may sends game play information to these remote gaming devices. In some examples, game play information used to calculate loyalty point awards may be sent from the gaming machine to the player tracking server 120 through the player tracking unit 107 or the information may be sent directly to the loyalty program instrument server 200. In other examples, the master gaming controller 104 may calculate the loyalty points awarded during a game play session. Thus, the transfer of game play information to a remote gaming device may not be required.

At the end of the player's game play session, the amount of loyalty points awarded to the player may be stored on a loyalty point instrument such as a printed ticket, a smart card, a debit card, a room key or a portable wireless device. For example, the printer 201 may print a ticket voucher showing the amount of loyalty points awarded to the player during the game play session. The player may later validate the ticket to receive the loyalty points. As another example, loyalty points awarded to the player may be stored on a smart card inserted into the card reader 24. In some examples, the loyalty point instrument may simply be used as a receipt to ensure that loyalty point credits earned by the player have been correctly credited to their account.

When the loyalty point instrument is issued to the player, various types of transaction information may be recorded on the loyalty point instrument and may also be stored to another memory location on the gaming machine 100, on the loyalty program instrument server 120, on the player tracking server 120 or some other gaming device. Examples of stored transaction information includes an issue time, a date, an instrument number, an instrument type, a machine number, etc., The transaction information stored on the loyalty point instrument and stored at the additional memory location may be compared to validate the loyalty point instrument. For instance, a player may wish to have the loyalty points stored on the ticket voucher to be later credited to their player tracking account or to redeem the points directly for a goods and services item without crediting the player's player tracking account. In some cases, the player may not even have a player tracking account. To credit or to redeem the loyalty points stored on the loyalty point instrument, the transaction is first validated. Specific examples of the loyalty point instrument validation process and other uses of loyalty point instruments are described with respect to FIGS. 3-8.

Figure 3:
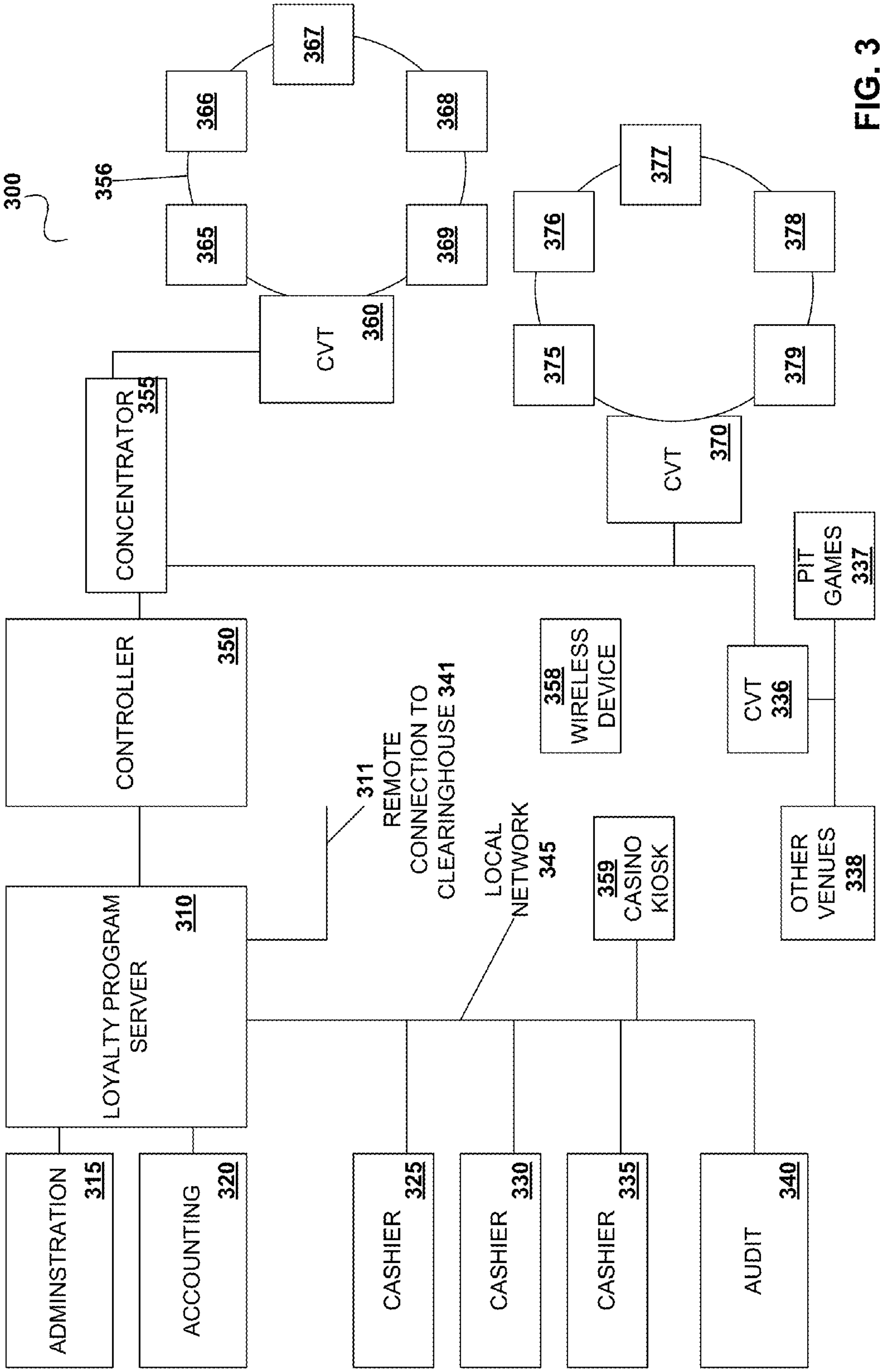
FIG. 3 is a block diagram of the components of a loyalty program instrument system for one embodiment of the present invention.

FIG. 3 is a block diagram of the components of a loyalty program instrument system for one example of the present invention. A loyalty program instrument system is the hardware components and software components needed to generate and validate loyalty program instruments. Components of a loyalty program system may include 1) data acquisition hardware, 2) data storage hardware, 3) loyalty program instrument generation and validation hardware (e.g. printers, card readers, ticket acceptors, validation terminals, etc.), 3) auditing software, 4) loyalty program instrument validation software and 5) database software. Many types of loyalty program instrument systems are possible and are not limited to the components listed above. A loyalty program instrument system may be installed at each property utilizing loyalty program instruments. To allow multi-site validations of loyalty program instruments, the loyalty program instruments systems at each property may be linked to a loyalty program transaction clearinghouse. The details of the generation and the validation of loyalty program instruments using a loyalty program instrument system at one property are described below with reference to FIG. 3.

In some embodiments of the present invention, the loyalty program instrument system may be implemented in conjunction with a cashless system that generates cashless instruments. Thus, a single instrument generation site may issue both cashless instruments and loyalty program instruments. For example, a gaming machine may issue printed tickets with a cash value that may be redeemed for cash or gaming credits as part of a cashless system or a gaming machine may issue printed tickets with a loyalty point value or a prize value that may be redeemed for goods and services as part of a loyalty program instrument system. Further, a single generation site may issue a plurality of different instrument types for cashless transaction and loyalty program transaction such as but not limited to smart cards, printed tickets, magnetic striped cards, room keys and portable wireless devices. In addition, a single validation site may accept and validate both cashless instruments and loyalty program instruments such as but not limited to smart cards, printed tickets, magnetic striped cards, room keys and portable wireless devices. An example of a cashless system that may be modified to implement both cashless instruments and loyalty point instruments with the present invention is the EZPAY™ system manufactured by IGT of Reno, Nev.

Details of apparatus and methods used to validate a cashless instrument and that may be applied to the validation of a loyalty point instruments are described in U.S. Pat. No. 6,682,421, entitled "Wireless Gaming Environment" which is incorporated herein in its entirety and for all purposes. Details of apparatus and methods used to validate a cashless instrument across multiple gaming properties and may be applied to the validation of a loyalty point instrument across multiple gaming properties are described in U.S. application Ser. No. 09/648,382 by Rowe filed Aug. 25, 2000, now U.S. Pat. No. 6,394,907, entitled "Cashless Transaction Clearinghouse" which is incorporated herein in its entirety and for all purposes. Details of apparatus and methods of using a smart card as a cashless instrument, at a single gaming property or across multiple gaming properties, that may be applied to the use of a smart card as a loyalty point instrument, at a single gaming property or across multiple gaming properties, are described in U.S. Pat. No. 6,852,031, entitled "EZPAY$^{TM}$ Smart Card and Ticket System" which is incorporated herein in its entirety and for all purposes. Details of providing secure transactions for a cashless system which may applied to a loyalty program instrument system are described in U.S. Pat. No. 6,675,152, entitled "Transaction Signature" which is incorporated herein in its entirety and for all purposes.

Returning to FIG. 3, a first group of gaming machines 365, 366, 367, 368, and 369 is shown connected to a first clerk validation terminal (CVT) 360 and a second group of gaming machines, 375, 376, 377, 378 and 379 is shown connected to a second CVT 370. The clerk validation terminals are used to store loyalty program transaction information generated when a loyalty program instrument is issued at a generation site such as a gaming machine. The loyalty program transaction information, which may be stored each time a loyalty program instrument is issued, may include but is not limited to prize information, loyalty point information, an establishment, a location, a bar code, an instrument type (e.g. ticket, smart card, room key, magnetic card, portable wireless device, etc.), an issue date, a validation number, an issue time, an instrument number, an instrument sequence number and a machine number. Also, the loyalty program transaction information may include transaction status information such as whether the loyalty program instrument has been validated, is outstanding or has expired. Some of the loyalty program transaction information stored in the CVT may also be stored on the loyalty program instrument as loyalty program instrument information. When a loyalty program instrument is validated, the information stored in the CVT and the information stored on the loyalty program instrument may be compared as a means of providing secure loyalty program transactions.

As described with reference to FIG. 2, all of the gaming machines are designed or configured to accrue loyalty points during a game play session, award a player some or all of the accrued loyalty points and store loyalty program information to a loyalty program instrument, such as a printed ticket, a magnetic striped card, a room key, a portable wireless device or a smart card, which is issued to the game player. The loyalty program instruments, as part of a loyalty program available at property 300, may be redeemed for goods and services. In addition, the gaming machines and other loyalty program validation sites at property 300 may accept loyalty program instruments issued at a different property from property 300 where the different property utilizes the same or a different loyalty program instrument system as compared to property 300.

A player may participate in a number of activities at the gaming establishment of property 300 for which the player can earn loyalty points. For instance, loyalty points may be earned while playing a game of chance at pit games 337, while playing one of the gaming machines, or while making a food purchase, an entertainment purchase, a transportation purchase, a lodging purchase, a merchandise purchase or a service purchase at one of the other venues 338 at property 300. Further, food purchases, entertainment purchases, transportation purchases, lodging purchases, merchandise purchases and service purchases that earn loyalty points for a patron may be made at venues outside of traditional gaming establishments but in affiliation with a gaming establishment. For instance, a patron may make a food purchase at a restaurant affiliated with a gaming establishment or may make merchandise purchase with a retailer affiliated with the gaming establishment. After their purchase, the patron may be issued a loyalty point instrument with a number of loyalty points that may be redeemed for goods, services and comps or may be later added to a loyalty point account of the patron. Affiliated venues that issue loyalty point instruments may be linked to a loyalty program server, such as 310, via the Internet.

As another example, a player, without providing identification information such as player tracking information or comp information, may be identified at a pit game. After rating the player's manner of game play over a certain period of time (e.g. amount bet), the player may be awarded a loyalty point instrument storing loyalty points, such as a printed ticket, earned during their pit game play. The loyalty point instrument may be later exchanged by the player for a comp, such as free meal at casino buffet. In another example, when player comp information has been provided by the player, the loyalty point instrument may be used as a receipt that is designed to allow the player to verify that their game play has been both correctly rated and correctly entered into the comp system.

After each activity, a player may be issued 1) a new loyalty program instrument storing the loyalty points earned for the activity or 2) an existing loyalty program instrument may be updated to store additional loyalty points. For instance, the existing loyalty program instrument may be, a smart card, already storing loyalty points earned from previous activities. The smart card may be modified to store additional loyalty points after each new activity. Accumulated loyalty points earned by a player and stored on a loyalty program instrument may be used to obtain goods, services and comps at various loyalty program validation sites at property 300, such as but not limited to: i) gaming machines, ii) cashier stations 325, 330, 335, iii) a casino kiosk 359, iv) from a casino service person with a hand-held wireless device 358 and v) at a clerk validation terminal 360 or 370.

In general user interfaces for viewing and modifying loyalty point accounts may be displayed on many different types of computing devices such as gaming machines, personal digital assistants, home computer linked to remote site via the Internet, a kiosk located in a casino, a phone and a video display interface. In one example, a video display interface may be a television monitor located in a hotel room. The hotel rooms may be linked by a local intranet to the loyalty program server 310. A touch screen, control pad or some other input device may be used with the television monitor to provide input to the loyalty point account user interface.

A game player may wish to use a loyalty program instrument issued during one activity during another activity at property 300. For example, a game player may a participate in a pit game 337 such as craps, roulette, black jack, etc. and may be issued a loyalty point instrument, such as a printed ticket, with a number of loyalty points based upon the manner in which they participated in the activity such as an amount wagered over a particular amount of time. Next, the player may desire to use the loyalty point instrument during another activity such as a game play session on one of the gaming machines 365, 366, 367, 368, 369, 375, 376, 377, 378 and 379. After the loyalty point instrument has been validated, as described below, the loyalty points stored on the loyalty point instrument may be used by the player to redeem prizes, goods, or services available on the gaming machine. In one example, for promotional purposes, only particular prizes, goods or services may be available on particular gaming machines to encourage game play of those machines. In another example, a player may redeem loyalty points stored on a loyalty point instrument to access a special bonus features or game play features on a gaming machine. For example, after the play has been issued a printed ticket with loyalty points during one activity, the player may initiate a game play session on a gaming machine by entering the printed ticket into a bill validator on the gaming machine. After ticket has been validated, as described below, some or all of the loyalty points stored on the printed ticket may be used to access a special bonus game or a special game play feature available on the gaming machine such as a chance to win a special jackpot. For instance, a player may commit five hundred loyalty points earned from a lodging purchase, stored on a loyalty program instrument, to activate a bonus feature on a gaming machine.

In yet another example, for convenience, a player may desire to combine loyalty points earned from a plurality of activities, such as gaming machine play, pit game play, merchandise purchases, etc., and stored on multiple loyalty program instruments onto a single loyalty program instrument. For example, a player may be issued a printed ticket or another type of loyalty program instrument from a gaming machine after a first game play session. At beginning of a second game play session, on the same or a different gaming machine, the player may insert the printed ticket into the gaming machine. After validating the ticket, the gaming machine may add any loyalty points stored on the ticket to any loyalty points earned by the player during the second game play session and issue a new loyalty point instrument, such as a printed ticket, with combined loyalty points.

Since loyalty points may be redeemed for goods and services, the loyalty points may be considered as having a "cash value" of some type. Thus, since the loyalty points have a "cash value", it is important to prevent fraud, such as validating a single ticket multiple times or validating a duplicate copy of an already validated ticket, and to provide accounting means for tracking unvalidated and validated tickets. To prevent fraud and to provide accounting for loyalty program instruments, generation sites and validation sites for loyalty point instruments, such as but not limited gaming machines, casino kiosks, cashier stations, clerk validation terminals, pit games and wireless gaming devices, may 1) when a loyalty program instrument is generated at generation site, store loyalty program transaction information to both the loyalty program instrument and to a memory location separate from the loyalty program instrument and 2) when a loyalty program instrument is validated, loyalty program transaction information stored on the loyalty program instrument may be compared with loyalty program transaction information previously stored at the memory location.

In one example, a clerk validation terminal (CVT), such as 336, 360 and 370, may be connected to a number of gaming devices that generate loyalty program instruments and the CVT may store loyalty program transaction information each time a loyalty program instrument is generated by one of the gaming devices connected to the CVTs issues a loyalty point instrument. For instance, CVT 360 is connected to gaming machines, 365, 366, 367, 368 and 369 in ring 356. The gaming machines 365, 366, 367, 368 and 369 may issue printed tickets as a loyalty program instrument. Each time one of the gaming machines issues a printed ticket, loyalty program transaction information describing the loyalty program transaction may be stored to the CVT and printed on the ticket.

When the CVTs are not connected to one another or the gaming machines are not linked together in some manner, a loyalty program instrument from one gaming machine may be only be accepted in another gaming machine which is in a group of gaming machines connected to the same clerk validation terminal. For example, a loyalty program instrument issued from gaming machine 365 might be accepted at gaming machines 366, 367, 368 and 369, which are each connected to the CVT 360, but not in gaming machines 375, 376, 377, 378, and 379, which are each connected to the CVT 370. In an analogous manner, when the cashless systems from one property are not connected together then a loyalty program instrument generated from gaming machine 366 may be not be used at property different from property 300.

The CVTs, 336, 360 and 370, store loyalty instrument transaction information corresponding to the outstanding loyalty program instruments, including ticket vouchers, smart cards and debit cards that are waiting for redemption. The CVTs may also store cashless instrument transaction information. In this example, the CVTs are separate from the gaming machine. However, the loyalty program transaction information may be also be stored within each gaming machine or one gaming machine may functionally act as a CVT for a group of gaming machines eliminating the need for separate CVT hardware. In addition, loyalty program transaction information may be stored in a loyalty program server 310. As previously described, the loyalty program server may be an EZ PAY™ server that also supports cashless instrument transactions.

As described above, the loyalty program transaction information may be used when the loyalty program instruments are validated in some manner such as for a prize redemption or to credit the points to a loyalty point account. The CVTs 336, 360 and 370 may store the information for the ticket vouchers printed by the gaming machines connected to the CVT. For example, CVT 360 stores ticket voucher information for ticket vouchers printed by gaming machines 365, 366, 367, 368, and 369. When a ticket is printed out or a loyalty point instrument is issued in some other manner, loyalty program transaction information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

When a player wishes to redeem a ticket or a loyalty program instrument of some other type, the player may redeem vouchers printed from a particular gaming machine at the CVT associated with the gaming machine or any other CVT which is part of the loyalty program instrument system associated with the CVT. For example, since CVT 360 and CVT 370 are connected as part of a single cashless system to the EZ pay server 310, a player may redeem loyalty program instruments or utilize loyalty program instruments at the gaming machines, the CVT's (336, 360 or 370), the cashiers (325, 330 and 335), the casino kiosk 359, the other venues 338 or the wireless cashiers 358. To redeem a loyalty program instrument, the loyalty program instrument is validated by comparing information obtained from the instrument with information stored within the CVT or other gaming devices which behaves functionally as a CVT. After the loyalty program instrument has been redeemed, the CVT marks the instrument paid in a database to prevent an instrument with similar information from being cashed multiple times.

Again, not all loyalty program systems may utilize CVTs, many of the functions of the CVT may be transferred to the cashless server, including the loyalty program server 310, eliminating the transferred function within the CVT. For instance, the cashless instrument transaction information may be stored in the loyalty program server 310 instead of the CVTs. Thus, the need to store loyalty program transaction information within the CVT may be eliminated.

In this example, multiple groups of gaming machines connected to CVTs, such as 360 and 370, and other gaming devices in the other venues 338 and the pit games 337 connected to CVT 336 are linked together in a cross validation network 345. The cross validation network is typically comprised of one or more concentrators 355 which accepts inputs from two or more CVTs and enables communications to and from the two or more CVTs using one communication line. The concentrator 355 is connected to a front end controller 350 which may poll the CVTs for loyalty program transaction information. The front end controller 350 is connected to a Loyalty Program server 310 which may provide a variety of information services for the loyalty program instrument system including accounting 320, administration 315 and loyalty program account maintenance.

The loyalty program server is a hardware and a software platform allowing loyalty program instruments to be utilized at all of the loyalty program validation sites (e.g. cashier stations, gaming machines, wireless cashiers and CVTs) within the single property 300. The loyalty program server 310 may also be used to provide multi-site validation of loyalty program instruments via a connection 311 such as a network interface to a remote loyalty program transaction clearinghouse. The loyalty program server is a communication nexus in the cross validation network. For instance, the loyalty program server 310 is connected to the cashiers, wireless devices, remote cashless instrument transaction clearinghouse, CVTs and the gaming machines and other gaming devices via the CVTs.

The cross validation network allows loyalty program instruments generated by any gaming machine connected to the cross validation network to be accepted by other gaming machines in the cross validation network 345. Additionally, the cross validation network allows a cashier at a cashier station 325, 330, and 335 to validate any ticket voucher generated from a gaming machine within the cross validation network 345. As an example, to redeem a loyalty program instrument for goods and services, a player may present the instrument at one of the cashier stations 325, 330, and 335, the casino kiosk 359 or to a game service representative carrying a wireless gaming device 358 for validating loyalty program instruments. Loyalty program transaction information obtained from the instrument is used to validate the instrument by comparing information on the instrument with information stored on one of the CVTs connected to the cross validation network. In addition, when the loyalty program instrument was issued at another property, the information on the instrument may be stored at the other property. Thus, to validate the loyalty program instrument, the loyalty program server 310 may have to communicate with the loyalty program transaction clearinghouse 341 via the remote connection 311 to obtain the information necessary to validate the instrument.

As loyalty program instruments are validated, this information may be sent to audit services computer 340 providing audit services, the accounting computer 320 providing accounting services or the administration computer 315 providing administration services. In another example, all of these services may be provided by loyalty program server 310 which may also be an EZPAY™ server. Examples of auditing services, which may be provided by loyalty program system software residing on the auditing computer 340 include 1) session reconciliation reports, 2) soft count reports, 3) soft count verification reports, 4) soft count exception reports, 5) machine instrument status reports and 5) security access report. Examples of accounting services, which may be provided by cashless system software residing on the accounting computer 320 include a) instrument issuance reports, b) instrument liability reports, expired instrument reports, c) expired instrument validation reports and d) instrument redemption reports. Examples of administration services, which may be provided by loyalty program system software residing on the administration computer 315 include i) manual loyalty program instrument receipt, ii) manual loyalty program instrument report, iii) loyalty program instrument validation report, iv) interim validation report, v) validation window closer report, vi) voided loyalty program instrument receipt and vii) voided loyalty program instrument report.

In another example, two or more gaming machines, such as 365, 366, 367, 368 and 369, may be linked together to allow loyalty points earned during the simultaneous game play of the two or more linked gaming machines to be combined on a single loyalty point instrument. Thus, a single game player playing two or more linked gaming machines simultaneously or a couple playing two or more linked gaming machines simultaneously may be able to receive a single loyalty point instrument issued from one of the linked gaming machines for their game play on all of the linked gaming machines. In another example, based upon the combined amount of game play for two or more gaming machines linked together, the rate of loyalty points accrued may be increased. Thus, a couple playing together on two or more linked gaming machines simultaneously or a single person playing two or more linked gaming machines simultaneously may be able to earn more loyalty points than when playing on two or more non-linked gaming machines simultaneously.

Figure 4:
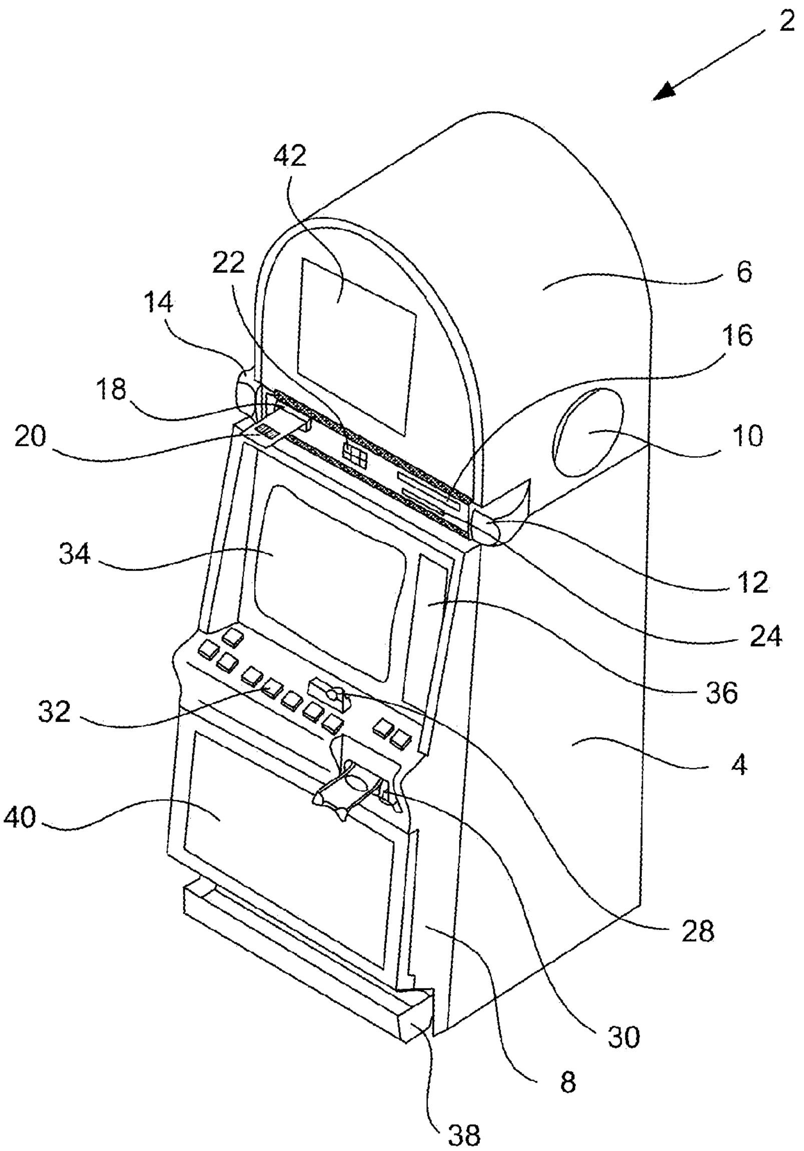
FIG. 4 is a perspective drawing of a video gaming machine of the present invention.

Turning to FIG. 4, more details of using loyalty program instruments in the context of game play on a gaming machine are described. In FIG. 4, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as loyalty point instruments or cashless instruments, a key pad 22 for entering player tracking information, a florescent display 16 for displaying player tracking information, a card reader 24 for entering a magnetic striped card containing player tracking information. Further, the top box 6 may house different or additional devices than shown in FIG. 4. For example, the top box may contain a bonus wheel or a back-lit silk screened panel which may be used to add bonus features to the game being played on the gaming machine. During a game, these devices are controlled and powered, in part, by circuitry, such as a master gaming controller, (See FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicator of credit. As another example, the card reader 24 may accept a debit card or a smart card containing cash or credit information that may be used to register credits on the gaming machine. In addition, the player may use a loyalty program instrument, such as smart card, ticket voucher, or debit card, to register previously accumulated loyalty points on the gaming machine. Typically, the information contained on the cashless instrument or loyalty point instrument, including the ticket voucher, smart card or debit card, is validated by a cashless system or loyalty program system. As described above, the cashless system and loyalty program may be a single system or separate systems in the present invention. The loyalty program instrument, including but not limited to a ticket voucher, smart card or debit card, may have been generated at the same property, for example a first casino where the gaming machine 2 is located or the instrument may have been generated at another property for example a second casino.

As described above, on a gaming machine, loyalty points may redeemed for a number of purposes such as to access a special bonus feature available on the gaming machine or to obtain goods and services. The loyalty program instrument typically contains information used to register loyalty points on the gaming machine, including gaming machine 2, and validate the registration transaction. For example, when a ticket voucher is used as a loyalty program instrument, the printed ticket voucher may contain information including but not limited to: 1) a ticket value, 2) a ticket issue date, 3) a ticket issue time, 4) a ticket transaction number, 5) a machine ID, 6) a ticket issue location and 7) a ticket sequence number. Information such as the ticket value, the ticket issue date, the ticket issue time, the ticket number and the machine ID may be common to loyalty program systems that generate and validate tickets issued at a single property. However, information such as the ticket issue location and other information may be needed to allow multi-site generation and validation of loyalty program instruments. In addition, other types of information, besides the information listed above, may be stored on the loyalty program instrument. For example, the ticket may contain information regarding a promotional prize that may be redeemed for loyalty points by the player when the ticket voucher is utilized in the gaming machine 2. As another example, the ticket may contain information such as a number of additional loyalty points that are needed to obtain a particular goods or services item.

The information on the loyalty program instrument may be recorded on the loyalty program instrument when the loyalty instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 20, may be printed from a printer, including printer 18. In the case of the smart card or debit card, the generation of the smart card or debit card refers to storing or encoding this information on the smart card or debit card. The generation of the debit card or smart card may occur when the smart card or debit card is inserted into the card reader 24 in the gaming machine 2 or at another site where smart cards or debit cards are issued. For example, smart cards or debit cards may be generated at ATM like terminals, at a cashier station when a player cashes out or prepaid smart cards or debits may be purchased within the gaming property (e.g. casino). As another example, the gaming machine may transfer loyalty point information to portable wireless device worn by the player via a wireless interface (not shown) on the gaming machine 2. After game play session where an amount of loyalty points have been awarded to the player, the amount of loyalty points awarded to the player and any other loyalty points input into the gaming machine may be downloaded to the portable wireless device worn by the player via the wireless interface.

A game play session where loyalty points are accrued by the master gaming controller on gaming machine 2 or by another logic device located on the gaming machine 2 may occur after a particular game event initiated by a game player. For example, a loyalty point session, where loyalty points are accrued, may be triggered by one or more of the following game events: a) depositing an indicia of credit into the gaming machine (e.g., inserting a cashless instrument into the card reader 24), b) inserting a bill or a cashless instrument into the bill validator 30, or inserting a coin in the coin acceptor 28, c) activating an input button on the gaming machine (e.g., input buttons 32), d) inputting a loyalty program instrument into a gaming device on the gaming machine (e.g. inserting an instrument in the bill validator 30 or the card reader 24), e) entering a code into the gaming machine (e.g., via the key pad 22 or via a touch screen) and f) combinations thereof. In the present invention, when the gaming machine has not received identification information from the gaming player, such as but not limited to a player tracking account information, loyalty points may be still be accrued during the game play session. The game play session where loyalty points are accrued may end following another game event such as but not limited to i) detecting zero credits registered on the gaming machine, ii) the gaming machine remaining idle for an amount of time, iii) detecting a tilt condition or detecting an error condition on the gaming machine, iv) detecting a game player's request for a loyalty program instrument and v) combinations thereof. After the loyalty point session ends, some or all of the loyalty points accrued during the session may be awarded to the game player. The loyalty points may be awarded to the player by storing the points to a loyalty program instrument which is issued to the player or the awarded points may be credited to the player's player tracking account after the player provides identification information to the gaming machine.

During the course of a game play session, a player may be required to make a number of decisions, which affect the outcome of one or more games played during the game play session. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40.

After the player has completed a game play session, a loyalty program instrument or cashless instrument may be generated at the gaming machine 2. The loyalty program instrument or cashless instrument may be a printed ticket voucher, a smart card, debit card or other cashless medium. Prior to issuing the instrument, the loyalty points awarded to the player may be displayed on the main display 34, the secondary display 42 or the player tracking display 16. Also, a prize menu may be displayed on one or more displays on the gaming machine 2 such as the main display 34, the secondary display 42 or the player tracking display 16. The prize menu may include one or more goods and services items. To redeem a particular prize, a particular amount of loyalty points is needed. As service items, the game player may be able to convert the awarded loyalty points to frequent flyer miles, obtain a free meal with the loyalty points or obtain a free nights lodging with the loyalty points. As an example of goods items, a player may be able to redeem loyalty points for clothes, food items, electronic goods, etc.

In some examples, the player may transfer the awarded loyalty points to a player tracking account. After providing account information (e.g., by inserting a player tracking card), the player tracking points may be transferred to a player tracking account of the player directly on the gaming machine. In other examples, the player may credit player tracking points or loyalty points, stored on a loyalty point instrument, to a player tracking account 1) over the phone, 2) at a clerk validation terminal, 3) at a cashier station, 4) at a casino kiosk, 5) via a web-interface, 6) via mail or 7) through a hand-held wireless device.

The game player may select one of the goods and services items from the prize menu using an input mechanism of some type. For instance, the prize menu may be displayed on a touch screen and the player may touch the screen to select one of the goods and services items. When the amount of loyalty points required to redeem the selected prize is less than an amount of loyalty points available on the gaming machine, a loyalty program instrument containing the prize instrument may be issued. For instance, when loyalty points are redeemed for a free meal, the player may be issued a ticket 22 from printer 18 which may be used to obtain a free meal when presented at one or more restaurants listed on the ticket.

In some examples, loyalty points accrued during the game play session may be combined with previously earned loyalty points to redeem a prize. Thus, loyalty points stored in one or more of a player's loyalty program accounts, such as a player tracking account, or loyalty points earned during other activities stored on one or more loyalty program instruments available to the player may be used to redeem prizes on the gaming machine. For instance, the player may insert five printed tickets containing various amounts of loyalty points into the gaming machine 2 using the bill validator 30. After each ticket has been validated, as described with reference to FIG. 3, the loyalty points stored on each ticket may be added to the amount loyalty points available on the gaming machine. As another example, the player may request that loyalty points be deducted from a loyalty program account such as a player tracking account. In this case, the gaming machine may send a message to remote server storing the loyalty point account information and request that some amount of loyalty points be deducted from the player's account. Assuming the number of requested points are available, the requested points may be deducted from the player's account and then transferred to the gaming machine. Finally, the method described above, may be implemented when the player has not accrued any loyalty points during a particular game playing session. For instance, the player may desire to redeem a prize using one or more loyalty program instruments storing loyalty points previously earned by the game player.

In some embodiments of the present invention, a single instrument may store both cash transaction information and loyalty program information. For instance, a smart card may be used to load credits onto a gaming machine and cash out an award from the gaming machine. Also, the smart card may be used to store loyalty program information generated during one or more of a player's game playing activities. Further, the smart card may store prize information for a prize redeemed at a gaming machine using loyalty points accrued by the game player.

In many loyalty point systems, players accumulate points in a linear manner so that a player's point total tends to increase over time. This results in some players having high point totals because they have accumulated points over a long period, even where they have not played recently. Such high point totals can cause a casino to treat such players as high value players even though their activity was a long time ago and they have not produced any significant business recently. Also, because some players have such high loyalty point totals, newer players may be discouraged and may feel that their business is not adequately recognized. Embodiments of the present invention provide systems and methods for awarding points to players to better reflect recent activity by players. This ensures that points are more current and thus ensures that new players can rapidly increase their point total and are not discouraged.

Figure 5:
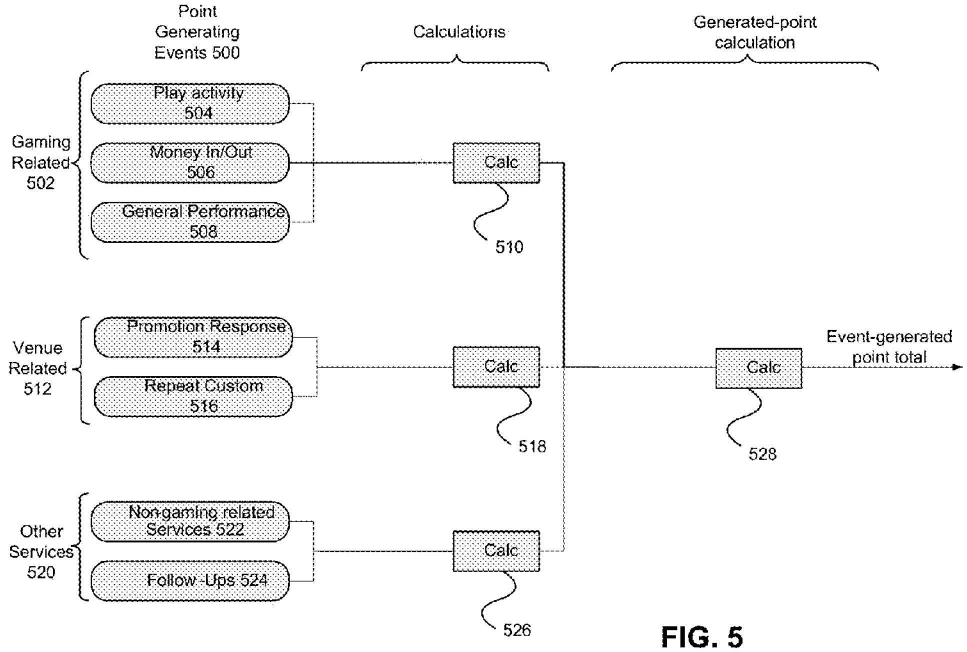
FIG. 5 shows points generated by a range of different activities.

FIG. 5 shows how a player may gain points through various point-generating events or activities. Point generating events 500 are shown in three different categories though it will be understood that points may be generated by a variety of different activities and that point generating events are not limited to those illustrated here. Instead of accumulating points in a linear manner, points may be calculated based on a range of factors in a more flexible manner. For example, game-related factors 502 shown here include play activity 504, money in/out 506, and general performance 508. These factors may be combined by a calculation 510 to provide a combined gaming-related point value. While some systems award points in proportion to the total money in (total that a player has bet) or money out (total that a player has won), here the calculation may be based on combining such numbers with other factors. For example, where a player is new to the game, the player may be awarded some additional points as a reward for trying the game. If a player is having bad luck, they may be awarded points at a higher rate to encourage them to continue playing. For example, a formula may be applied that combines various factors, e.g. total=($ played+(0.4*Games played)−(0.5*Games won). Applying this formula to two players shows how results are obtained, Player A played $50 over 70 games and won 10 of them. Player B played $60 over 40 games and won 20 of them. Player A's score=(50+(0.4*70)−(0.5*10))=73; compared to Player B's score=(60+(0.4*40)−(0.5*20))=66. So even though Player B played more money, Player A resulted in a higher score because he was not as lucky.

Some other examples of point generating events that may be used to calculate a point total are: return play for visiting the casino again within a required time; 'welcome back' for players who haven't played for a long time, such as 3 months; length of play—playing for 5 hours straight; max bet; and card levels (blue, gold, platinum).

Venue-related events 512 include promotion response 514 and repeat custom 516. A promotion response may be the player's acceptance of a particular promotion offered by a casino, for example a player who plays at off-peak times when the casino needs more business may be provided with additional points, or may have points awarded at a higher rate. A returning customer may receive points when they initially return to a casino as a means for rewarding them for their repeat business. The number of points awarded may depend on the nature of the player's previous activity (i.e. the amount of money spent by the customer and the period of time since the customer last played. Venue-related points may be calculated 518 according to a predetermined relationship giving weight to different venue-related factors. An example formula is ($ played+(200*# visits last week)+(100*# visits last month). Player A played $500 and had 4 visits last week and 15 visits last month. Player B played $2000 and had 0 visits last week and 2 visits last month. Player A's score=(500+(200*4)+(100*15))=2800; compared to Player B's score=(2000+(200*0)+(100*2))=2200. So even though Player B played more money, Player A resulted in a higher score because he is a more loyal customer.

Other services 520 that may result in points being awarded to a player include non-gaming related services 522 such as hotel and restaurant services. Points may be awarded according to the amount that a player spends on such services or according to a more complex formula. Other services 520 also includes followups 524. The other services values may be combined in a calculation 526. An example formula is ($ played−$ won+(Hotel $/1.5)+(Food $/2). Player A played $2000, won $1800, paid $150 for the hotel, and paid $60 for food. Player B played $3000, won $2700, but didn't pay for any hotel or food. Player A's score=(2000−1800+(150/1.5)+(60/2))=330; compared to Player B's score=(3000−2700+(0/1.5)+(0/2))=300. So even though Player B played and lost more money, Player A resulted in a higher score because he bought hotel and food.

Points that are calculated 510, 518, 526 for each type category of point generating event are combined in a generated point calculation 528. In embodiments of the present invention, this calculation is not simply the addition of the points from each category but is a more flexible calculation. For example, where a player provides business in more than one category, they may gain additional points to reward them for their loyalty. Thus, a player who responds to a promotion and uses a casino restaurant would be awarded more points than the total awarded to two different players who respectively respond to a promotion and use the restaurant. For example, a casino offers a promotion where you can buy something at half price. An example formula may be ($ played+((promo $/2)+1)*(Food $+1)). Player A played $1000, bought the promo item for $8, and paid $19 for food. Player B played $1000, did not buy a promo item, and paid $19 for food. Player C played $1000, bought the promo item for $8, and did not buy food. Player A's score=(1000+((8/2)+1)+(19+1))=1100; compared to Player B's score=(1000+((0/2)+1)+(19+1))=1020, as compared to Player C's score=(1000+((8/2)+1)+(0+1))=1004. So even though they all played the same amount of money, Player A resulted in a higher score because he bought a promo item and food.

Many player loyalty systems award points in a manner that is known to players so that players expect a certain number of points for a given set of player activities. However, according to some examples of the present invention, the calculations may be hidden from players so that players cannot predict their point total. This avoids players gaming the system to obtain comps that are disproportionate to their business. It also means that less data needs to be maintained. Where players expect certain points for certain activities, their activities are generally recorded so that any discrepancies in point totals can later be resolved. This means that data is stored for many players over a range of activities, often for quite long periods. Such data storage may be costly and burdensome for a business. By condensing player activity to a single number in a manner that is not public, the need to maintain a large database can be reduced or eliminated.

While combining points from different activities in a non-linear manner provides additional flexibility in calculating player loyalty points, such calculation alone may not adequately recognize recent activity (as opposed to activity in the more distant past). According to embodiments of the present invention, a group of players are ranked according to their generated point totals and then points are awarded according to their rank. These rank-based points can then replace the generated points and the generated points can be discarded. In this way, absolute values (generated point totals) are replaced by relative values (rank-based points). This allows players to be more closely grouped together and thus avoids discouraging those players whose generated point totals are low.

Figure 6:
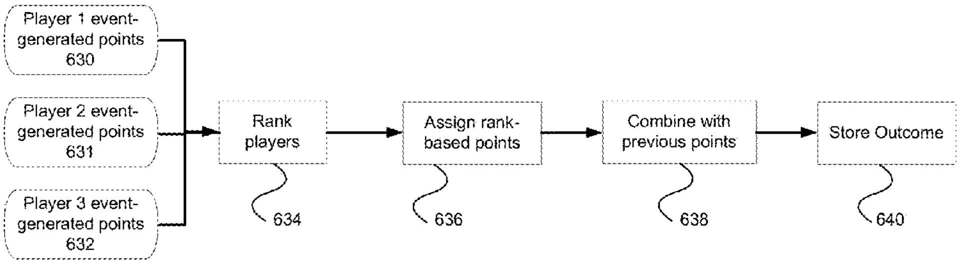
FIG. 6 shows an example of a player ranking scheme that ranks players according to their generated points and then assigns rank-based points according to rank.

FIG. 6 shows an example of ranking players (player 1, player 2, and player 3) according to their generated point totals 630-632. Generated point totals 630-632 are used to rank the players in order 634. For example, where generated point totals are 100, 50, and 10 for players 1, 2, and 3 respectively, player 1 is ranked first, player 2 ranked second, and player 3 ranked third. Then, rank-based points are assigned to each player according to their rank 636. For example, the first ranked player (player 1) may be awarded 180 points, the second ranked player (player 2) may be awarded 200 points, and the third ranked player (player 3) may be awarded 100 points. Thus, the second ranked player gets more rank-based points than the first ranked player. Also, player 3 with the lowest generated point total (10) has one tenth the number of generated points that player 1 with the highest generated point total (100) has, but after ranking, player 3 gets half as many rank-based points as player 2. Thus, the players are more closely grouped after ranking than before.

Conversion of generated-points to rank-based points may be achieved using a predetermined mapping scheme. For example, such a scheme may be stored in a lookup table that has point entries corresponding to different ranks. In some examples, a different point value may be associated with each rank. In other examples, some ranks may share the same point values. For example, all ranks below a certain value may be assigned the same rank-based point value so that lower performing players all get the same number of points. This can prevent lower performing players from falling far behind and becoming discouraged. Conversion of generated-points to rank-based points may also be achieved using a calculation to transform the generated points. In either case, the relationship can be adjusted easily to reward players appropriately. If it appears that some players are falling far behind (or gaining a large lead) then an adjustment may be made to bring players closer and thus increase the sense of competition. Also, multiple players can be given the same rank. For example, the top 5 players may all be ranked #1, with the next 10 players all ranked #2, etc.

After rank-based points are assigned to players 636, the rank-based points may be combined with prior rank-based points 638 to combine the ranking with a previous ranking. In general, this is done by simply adding together the prior rank-based points and the new rank-based points, though these points may also be combined in other ways (e.g. averaging, or calculating a weighted-average). The combined rank-based points are then stored as the players' updated point totals 640. These totals may later be updated by being treated as prior rank-based points after some additional point-generating activity has occurred. In this way, ranking may be performed periodically, and a point total may be updated to reflect the latest ranking. Because ranking reflects relative performance and not absolute performance, ranking can be used to keep players closer in point totals than they would be in a linear generated point scheme. Also, periodic ranking means that recent activity is rewarded, while those players with little or no recent activity may drop in rank. A player may rise to the top of such a ranking scheme quite rapidly compared with a cumulative point system.

One advantage of certain examples shown here is that a player's activity is reflected by a single number and all of the player's activity is condensed into the number. The number may be a rank, or a rank-generated point total. In some examples, such a number is stored in a central database in a manner that it is linked to an individual player. Each time the player enters a player tracking card, loyalty point instrument, or is otherwise identified performing point-generating activity, the player's point total is accessed in the database and is updated as the player performs point-generating activity.

One problem with such a system is that it is not anonymous and some players do not want to use any type of identification. Another problem is that such a system requires frequent communication between gaming machines (or other point-generating devices) and the central database. Generally, all point-generating activity is communicated to the central database in such systems and is then stored at a central location.

According to an embodiment, the outcome of the ranking is stored on a player loyalty instrument such as a smart card. The outcome may be the player's combined rank-based points or their overall rank after combination of prior rank and most recent rank. The outcome may also be maintained at a central location, or may only be maintained on the player loyalty instrument. Where such an outcome is maintained on the player's loyalty instrument, very little communication is required between a gaming machine and a central point manager. While some communication is needed so that ranking of players can be performed, this can be as simple as sending the player's generated point total periodically and then receiving the player's updated ranking (rank-based points).

Figure 7:
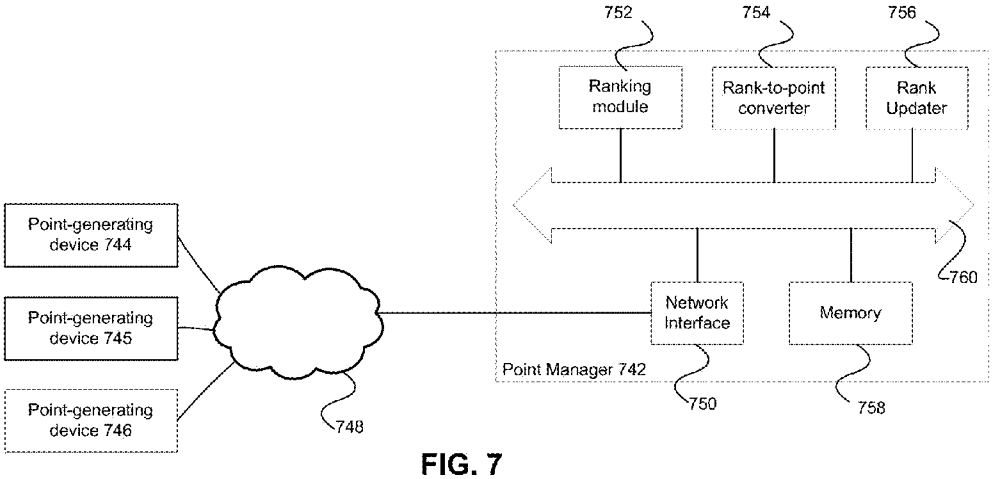
FIG. 7 shows an example of a system used in a player ranking scheme including a point manager.

FIG. 7 shows an example of a point manager 742 that provides rank-based points to players. Three point-generating devices 744-746 are shown connected to the point manager 742 by a network 748. Point-generating devices 744-746 may be gaming machines or other devices as previously described. The point manager 742 has a network interface 750 that connects to the network 748 and allows communication with the point-generating devices 744-746. The point manager 742 also has a ranking module 752 that ranks players according to the generated point values associated with each player. A rank-to-point converter 754 then converts the ranks from the ranking module to rank-generated points. A rank updater 756 combines rank-generated points with prior points to provide updated rank-generated points. A memory 758 stores rank-generated points so that they can be retrieved later for updating by the rank updater 756. The updated rank-based points are generally sent back to the point-generating devices 744-746 through the network interface 750 and the network 748 so that they can be stored on player loyalty instruments at the point-generating devices. A bus 760 is shown connecting the components of the point manager 742 in this example. Such a point manager may be a circuit designed for this purpose. However, in other examples, the point manager is implemented as software operating on a server such as a loyalty program server, and the individual components shown are portions of software and not physically separate hardware components.

It should be noted that the system shown in FIG. 7 allows players to obtain loyalty points anonymously. A player may insert a card in a device at the start of point generating activity (or at some time during point generating activity) and have their rank updated without ever giving their personal information. Such cards may be available to players without any requirement to register or otherwise associate the card with a particular individual.

Tournament Play

While aspects of the present invention may be applied to player loyalty point systems, aspects of the invention may also be applied to other systems that assign points to multiple players based on their activity. An example is a system used in tournament play. Tournament play involves multiple players competing against each other, and not just playing for their individual winnings. For example, players in a tournament may compete to see who can win most from their gaming machine over a given period, with the winner gaining some reward such as a tournament prize. In most tournaments, players accumulate points in a linear manner, for example by adding each win (dollar out) to a player's total winnings, with the players tournament score being their total winnings at the end of the tournament. However, such a system does not give players a chance to catch up if they enter the tournament late. Also, players may be discouraged if they fall behind because of a large gap between the top players and lower-performing players.

According to embodiments of the present invention, a tournament play system uses a ranking scheme such as that shown in FIG. 6 and ranking apparatus such as that shown in FIG. 7. As players play, they are periodically ranked according to their play-generated points (e.g. by winnings since the last ranking) and these ranks are converted to rank-generated points according to some predetermined mapping or function. Rank-generated points are combined with rank-generated prior points to obtain updated points (or updated ranks). Thus, instead of accumulating points in a linear manner, players' performances over limited periods are periodically compared and points assigned according to relative performance. These rank-based points are used to update each player's point total. In this way, a player's activity in the past can be given little weight, with relative performance in the recent past being given more weight. Players in such a tournament may have their ranking reported to them (on a main display, or a separate display) so that they know where they rank. Ranks may be reported on a periodic basis as ranking is performed.

Ranks may be individually assigned so that each player always has a different rank (no ties). However, to create a more competitive tournament, it may be desirable to have lower ranked players grouped into common ranks. For example, in a tournament with a hundred players, any player ranking lower than the top twenty ranks could be discouraged and might want to drop out. Such players can be grouped so that for example the top twenty players are individually ranked and all remaining players (the eighty lowest performing players) are tied at twenty-first place. These players then remain close enough to the top players that they have a realistic chance of wining. This maintains their interest in the game and encourages their continued play. Such clustering of players may be performed when players' ranks are combined with their prior ranks. Also, to maintain a competitive tournament, players who obtain lower generated points (e.g. lower winning amounts) in a given period may be given higher rank-based points because the mapping scheme may assign more rank-based points to a lower rank than a higher rank. In this way, a top scoring player does not become complacent, and lower scoring players do not lose interest.

It should be noted that tournament play may use a separate point system to the loyalty point system described above. Both systems may be implemented at the same time where a player who is in a loyalty program also participates in a tournament. As with the loyalty point system, a players' rank (or rank-based points) may be stored centrally or may be written to an instrument such as a smart card. Such smart cards (or other instruments) may be linked to a particular individual, or may be anonymous. Furthermore, for tournament play, no separate instrument may be needed because a player will generally remain at one machine throughout a tournament.

Example of Ranking

FIGS. 8A-8E show an example of ranking of players according to an embodiment of the present invention. This ranking may be part of a loyalty reward system or a tournament play system. FIG. 8A shows points generated for players during a first period of time (e.g. during a round in a tournament). Players A-J gain points according to a variety of factors including Coin In, Coin Out, Denomination, Total Bet, and Player Status. These factors are combined to calculate a generated-point total using one or more calculations that appropriately weight different factors to obtain an event-generated point total for each player. As can be seen, player F played much more than any other player (Coin In=56,982) and has received a larger event-generated point total (113.786) than any other player. Player E has received the second largest event-generated point total (62.100) even though player E has played relatively little (Coin In=60). Other players received lower event-generated point totals. Thus, players' generated point totals are not simply proportional to the amount a player spends, but also takes into account other factors.

FIG. 8B shows points generated for players during a second period of time (e.g. during a second round in a tournament). As before, generated point totals are calculated based on various factors, not just the amount that the player bets. The calculation used in FIG. 8B may not be the same as that used in FIG. 8A. For example, the first round of a tournament may use one calculation and then the second round may use a different calculation that weights factors differently.

FIG. 8C shows ranking of players according to their generated point total for the first round (FIG. 8A). Generated point totals are shown in the left column for each player (identified in the middle column). In particular, FIG. 8C shows top scoring player F (generated point total=113.786) at the top, with each lower scoring player shown below in order of their generated point total. The right hand column shows rank-based points for each player. Rank-based points are generated from the player's rank according to a mapping scheme such as a lookup table or a particular function. In this case, player F gets 35 rank-based points while player E (second in generated point total) gets 42 rank-based points. Thus, rank-based points are not necessarily awarded in order of rank. A lower ranked player may get more rank-based points than a higher ranked player. Also, it will be noted that rank-based points are less spread out (ranging from 10 to 35) than generated point totals (from 0.048 to 113.786). Thus, rank-based points for a group of players tend to have a smaller standard deviation than event-generated point totals for the group. Rank-based points can be used to help to even out players' scores and thus keep a tournament competitive.

FIG. 8D shows a similar ranking performed for the second round (FIG. 8B). It should be noted that the mapping of ranks to rank-based points does not have to be the same every time (though it may be the same). Here the rank-based points awarded to each rank are different to the first round, with the points ranging from 33 to 66 and with rank-based points awarded in order (i.e. with lower ranking players receiving lower rank-based points).

FIG. 8E shows how first and second round rank-based points are combined. In the present example, the first round establishes the players' initial rank (i.e. they have no previous ranking and all start from the same point). So at the end of the first round, the players' rank-based point totals are simply the rank-based points that they have obtained in the first round. After the second round their rank-based point totals are updated to reflect the rank-based points obtained in the second round. In this example, rank-based points for the second round are similarly added to the rank-based points for the first round. Thus, for example, player D obtained 34 rank-based points in the first round and 60 points in the second round. Player D gets an updated rank-based point value of 34+60=94, the highest updated rank-based point value. Other players are similarly ranked according to their updated rank-based points. Indicators of the players' ranks (e.g. their actual rank or their rank-based point totals) are then stored at a central location, on individual instruments for each player, or both.

When a rank-based point totals are updated in this way, previous rank-based point totals may be discarded (i.e. the rank-based points for the first and second round may be discarded after the updated rank-based point values are calculated). Thus, each player's record is condensed to a single number, with the number being updated periodically to reflect new activity. Although many factors may be considered in obtaining such a number, the data associated with these factors does not have to be stored or communicated, so the single number is efficient in terms of bandwidth and in terms of memory usage.

While reference is made here to periodic updating of the rank-based point total, it will be understood that such updating does not necessarily occur at fixed time intervals, but may occur in some other pattern. For example, in tournament play, certain games may be arranged in rounds that take different amounts of time. Ranking may be performed after each round. Ranking may be triggered by a player reaching a particular point in play, such as a particular total amount bet.

Figure 9:
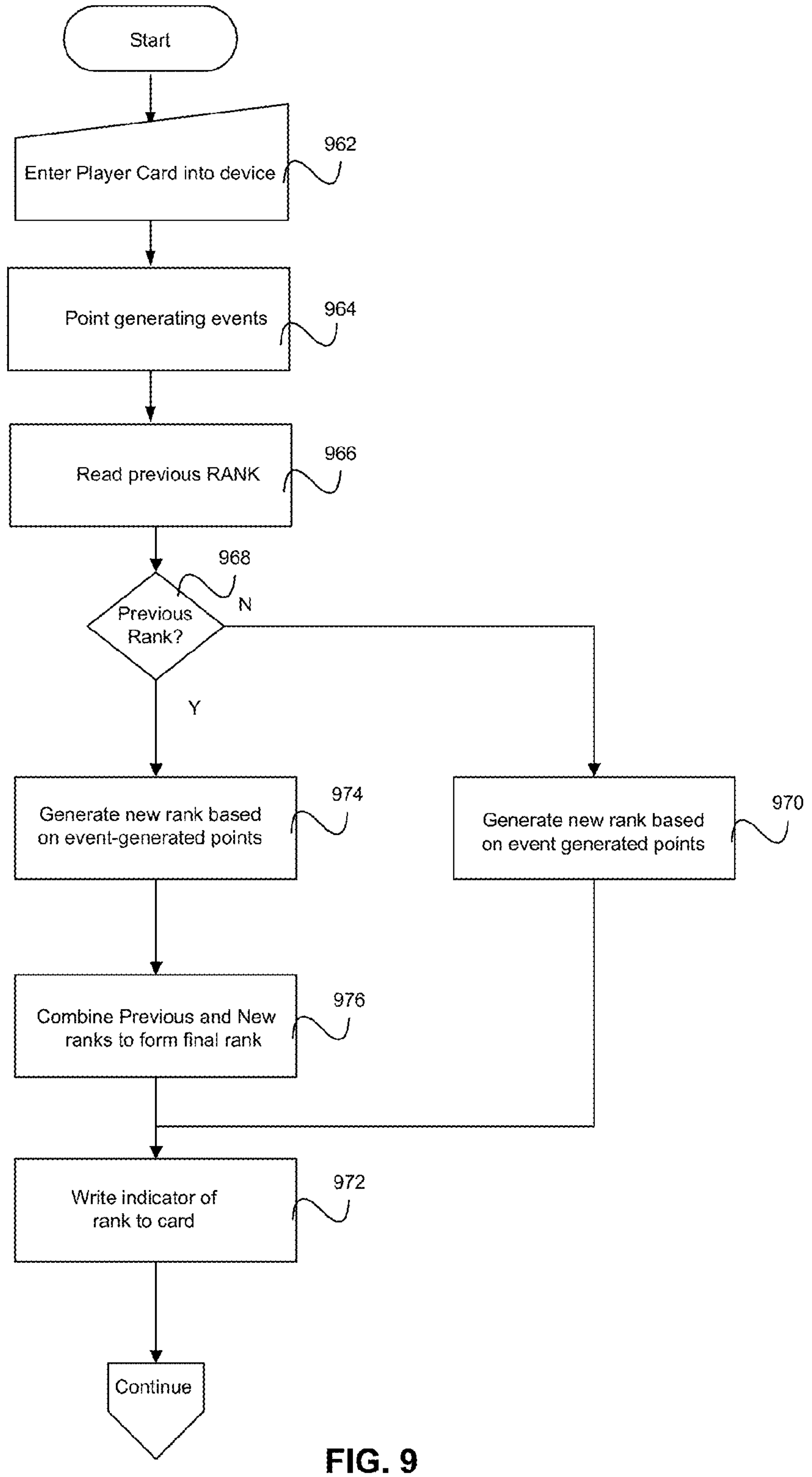
FIG. 9 shows a flowchart of a ranking scheme.

FIG. 9 shows a flowchart for a process of ranking players (like that of the example above). A player enters their card into a gaming machine or other device that generates points 962. Subsequently, point generating events occur 964 (such as the player playing the gaming machine). The player's previous rank (if any) is then read 966 from the card. The order of these steps is not critical and the player's rank may be read immediately after the player enters the card, or during point generating activity also. If the player has no previous rank 968 (e.g. the player has not played previously) then the player's generated points from point generating events are used to calculate the player's rank with respect to other players 970. An indication of this rank is then written to the player's card 972. The rank itself may be written, or a rank-based point value may be written to the card. The player may then continue play, or may withdraw their card with the indicator of rank stored on it. If the player has a previous rank 968, then the player's rank from their point generating events is obtained 974 and combined with their previous rank to form their new or updated rank 976. An indicator of this new or updated rank is then written to the card.

Figure 10:
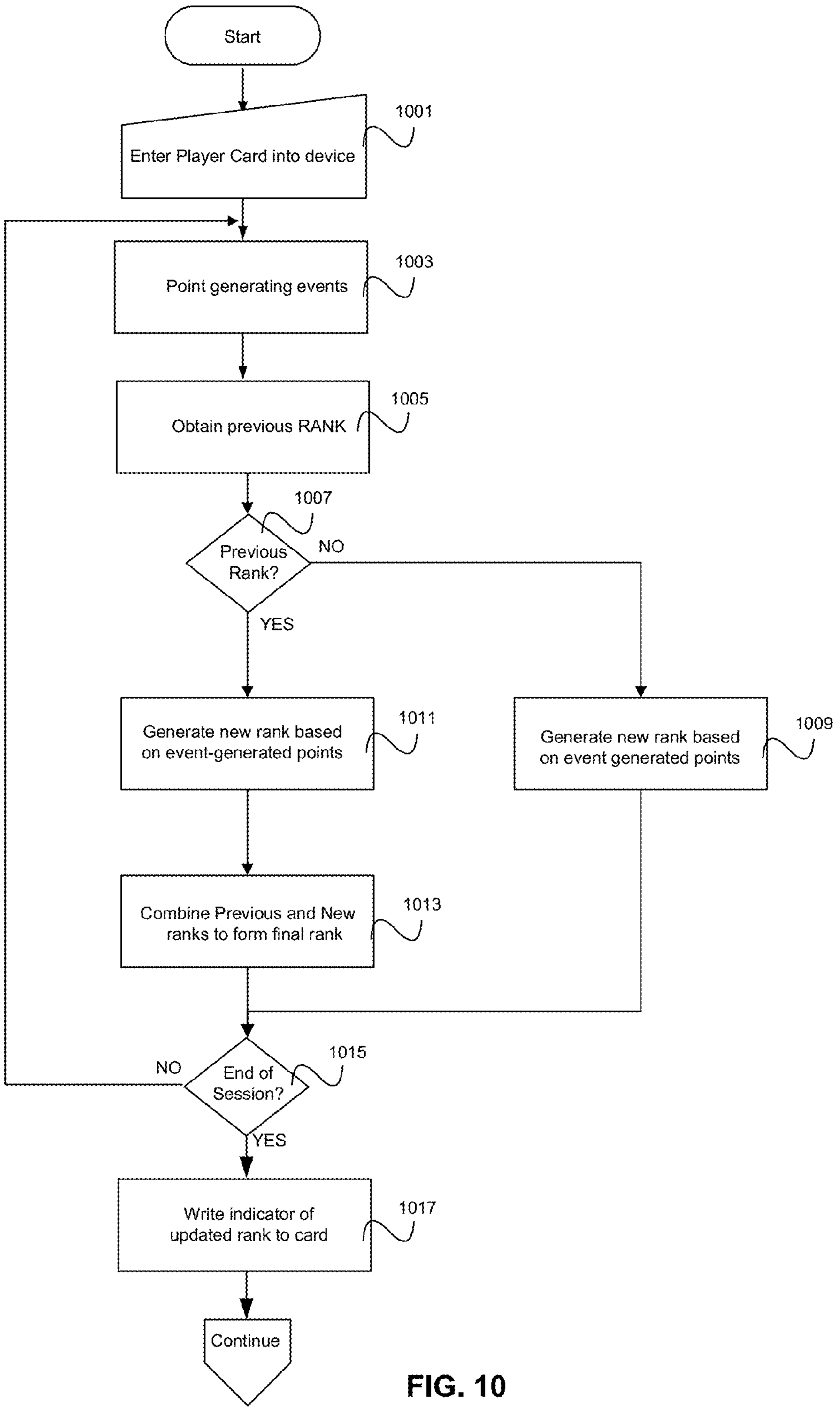
FIG. 10 shows a flowchart of a repeated ranking cycle.

FIG. 10 shows a flowchart of a process that repeatedly ranks players during a session. The player enters the card into the device 1001 as before and performs some point generating activity 1003. At some time (here, after point generating activity) the player's previous rank (if any) is obtained from the card 1005. If the player has no previous rank 1007, then a new rank is generated based on event-generated points 1009. If a previous rank exists 1007, then the new rank is generated based on event-generated points 1011 and the previous rank and new rank are combined to obtain an updated rank 1013. If the session ends at this point 1015, then the updated rank is written to the card 1017. However, if the session does not end 1015, then the process returns to wait for more point generating events 1003. This cycle may be repeated for as long as the player is at a particular device. While this example shows updated rank being written to the device only at the end of a session, in other examples the updated rank may be written to the card whenever it is updated so that the card always reflects the updated rank. In this way, if there is a loss of communication then the card contains the most up-to-date information.

Where a ranking system is used for loyalty points, such points are generally redeemable for rewards including casino comps as previously described. Where a ranking system is used for tournament play, a winner (or winners) of a tournament may receive a reward such as a cash prize at the end of the tournament. Thus, a player may be provided with some reward according to their rank-based point total after some period of time, or after a particular threshold is reached.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

What is claimed is:

1. A method of providing player points for a wager-gaming player tracking system to a plurality of players comprising:

obtaining, by a player tracking server, an event-generated point value for each player of the plurality of players;

ranking each player of the plurality of players with respect to the other players in the plurality of players according to the event-generated point values; and associating rank-generated point values with each player of the plurality of players, the rank-generated point value being determined from each player's rank according to a predetermined mapping of ranks to rank-generated point values, wherein the predetermined mapping of ranks to rank-generated point values assigns a higher rank-generated point value to a first player, and a lower rank-generated point value to a second player, the second player having a higher rank than the first player, and the first player and the second player included in the plurality of the players.

2. The method of claim 1 further comprising generating combined rank-generated point values from combining the rank-generated point value associated with each player of the plurality of players with their prior rank-generated point values.

3. The method of claim 2 further comprising ranking each player in the plurality of players with respect to the other players in the plurality of players according to the combined rank-generated point values to provide a combined rank for each player of the plurality of players.

4. The method of claim 3 further comprising updating the combined rank for each player of the plurality of players one or more times, the updating combining a prior combined rank with a rank-generated point value that is derived from ranking the plurality of players with respect to each other according to event-generated point values for events occurring after generation of the prior combined rank.

5. The method of claim 4 wherein the updating is repeated according to a predefined pattern.

6. The method of claim 3 wherein each player of the plurality of players is informed of their combined rank.

7. The method of claim 3 further comprising storing an indicator of the combined rank for each player of the plurality of players on machine-writable instruments individually associated with each player of the plurality of players.

8. The method of claim 7 wherein a machine-writable instrument contains no identification information to identify a corresponding player of the plurality of players.

9. The method of claim 1 wherein event-generated point values for a player of the plurality of players are generated by combining points earned by the player at casino gaming and other activities.

10. A method of managing a plurality of wager-based gaming machines that are operated by a plurality of players in a competition comprising:

receiving, by a server, data from the plurality of wager-based gaming machines regarding player activity on each wager-based gaming machine of the plurality of wager-based gaming machines;

awarding the plurality of players a plurality of first point values, each player in the plurality of players awarded a first point value according to the player's activity on the wager-based gaming machine operated by the player;

ranking each player of the plurality of players with respect to the other players in the plurality of players according to their associated first point values, the ranking assigning each player of the plurality of players a new rank;

obtaining a plurality of second point values for the plurality of players, the second point value for each player of the plurality of players obtained from the player's new rank according to a predetermined mapping of new ranks to second points, wherein the predetermined mapping of new ranks to second points assigns a higher second point value to a first player, and a lower second point value to a second player, the second player having a higher rank than the first player, and the first player and the second player included in the plurality of the players;

calculating a final rank for each player of the plurality of players by combining an initial rank for the player with the new rank for the player; and providing awards to selected players of the plurality of players according to their final rank.

11. The method of claim 10 wherein awards include at least one of: a bonus round on a wager-based gaming machine, a restaurant meal, and a hotel stay.

12. The method of claim 10 wherein the final rank for each player of the plurality of players is written to machine-writable instruments individually associated with each player of the plurality of players.

13. The method of claim 10 wherein calculating a final rank includes calculating distinct individual ranks for players of the plurality of players with high final ranks and calculating shared ranks for players of the plurality of players with low final ranks so that the number of ranks is less than the number of players in the plurality of players.

14. A method of operating a gaming network that includes a plurality of player-operated wager-based gaming machines connected to a server, the method comprising:

assigning each wager-based gaming machine player an initial ranking that designates their position relative to other wager-based gaming machine players; and subsequently updating the rankings of the plurality of wager-based gaming machine players, the updating including:

receiving data from the gaming machines indicating the wager-based gaming machine players' ranking-eligible activity, quantifying each wager-based gaming machine player's ranking-eligible activity, ranking each wager-based gaming machine player of the plurality of wager-based gaming machine players with respect to the other wager-based gaming machine players in the plurality of wager-based gaming machine players according to their ranking-eligible activity to obtain an activity-rank, associating a rank-generated point value with each wager-based gaming machine player of the plurality of wager-based gaming machine players, the rank generated point value being determined from each wager-based gaming machine player's activity-rank according to a predetermined mapping of activity-ranks to rank-generated point values, wherein the predetermined mapping of activity-ranks to rank-generated point values assigns a higher rank-generated point value to a first player, and a lower rank-generated point value to a second player, the second player having a higher activity-rank than the first player, and the first player and the second player included in the plurality of the players, combining the rank-generated point value for each wager-based gaming machine player with the initial rank of the wager-based gaming machine player to obtain a final rank, and writing the final rank in place of the initial rank in a computer readable storage medium.

15. A wager-based gaming network comprising:

a plurality of wager-based gaming machines; and a server connected to each of the plurality of wager based gaming machines, the server configured to rank players of the plurality of wager-based gaming machines based on player activity with respect to each other and to convert player ranks thus obtained to rank-based points according to a predetermined mapping of ranks to rank-based points, wherein the predetermined mapping of ranks to rank-based points assigns more rank-generated points to a first player than to a second player, the second player having a higher rank than the first player, and the first player and the second player included in the players of the plurality of wager-based gaming machines, the server further configured to maintain player rankings based on the rank based points.

16. The wager-based gaming network of claim 15 wherein the server maintains the player rankings at a central location.

17. The wager-based gaming network of claim 15 wherein the server maintains the player rankings on machine-writable instruments individually associated with players.

* * * * *

UNITED STATES PATENT AND TRADEMARK OFFICE

CERTIFICATE OF CORRECTION

PATENT NO. : 8,449,384 B2
APPLICATION NO. : 12/408436
DATED : May 28, 2013
INVENTOR(S) : Anthony J. Baerlocher et al.

It is certified that error appears in the above-identified patent and that said Letters Patent is hereby corrected as shown below:

IN THE CLAIMS

In Claim 9, Column 25, Line 39, between "wherein" and "event" insert --the--.
In Claim 11, Column 26, Line 6, between "wherein" and "awards" insert --the--.
In Claim 13, Column 26, Line 13, replace "a" with --the--.
In Claim 13, Column 26, Line 17, replace the first instance of "the" with --a--.
In Claim 13, Column 26, Line 17, replace the second instance of "the" with --a--.
In Claim 15, Column 27, Line 6, replace "rankings" with --ranks--.
In Claim 15, Column 27, Line 7, replace "rank based" with --rank-based--.
In Claim 16, Column 27, Line 9, replace "rankings" with --ranks--.
In Claim 17, Column 27, Line 11, replace "rankings" with --ranks--.

Signed and Sealed this
Thirty-first Day of December, 2013

Margaret A. Focarino

Margaret A. Focarino
*Commissioner for Patents of the United States Patent and Trademark Office*